(12) United States Patent
McIlvaine

(10) Patent No.: US 6,510,935 B1
(45) Date of Patent: Jan. 28, 2003

(54) LOW PROFILE EXTENDED FLOW TRACK SYSTEM

(75) Inventor: Howard McIlvaine, Freehold, NJ (US)

(73) Assignee: Unex Manufacturing Inc., Jackson, NJ (US)

( * ) Notice: Subject to any disclaimer, the term of this patent is extended or adjusted under 35 U.S.C. 154(b) by 0 days.

(21) Appl. No.: 10/058,245

(22) Filed: Jan. 29, 2002

(51) Int. Cl.⁷ ............................................. B65G 13/00
(52) U.S. Cl. ................... 193/35 R; 198/860.2; 414/276
(58) Field of Search ............. 198/860.1, 860.2, 198/861.1, 735.2; 193/35 R; 414/269, 276, 529

(56) References Cited

U.S. PATENT DOCUMENTS

| | | | |
|---|---|---|---|
| 1,107,882 A | * 8/1914 | Bickhart | 198/860.2 |
| 6,102,185 A | 8/2000 | Neuwirth et al. | 414/276 |
| 6,132,158 A | 10/2000 | Pfeiffer et al. | 193/35 R |
| 6,325,202 B1 | * 12/2001 | Gaines | 198/860.2 X |

FOREIGN PATENT DOCUMENTS

| | | | | |
|---|---|---|---|---|
| AU | 142987 | * | 5/1950 | 198/860.2 |

* cited by examiner

*Primary Examiner*—James R. Bidwell
(74) *Attorney, Agent, or Firm*—Salzman & Levy

(57) ABSTRACT

An extended flow track system has a pair of inner and outer splice members for linking the side rails of tandem flow tracks. The splice members eliminate horizontal shifting between the front and rear flow track members. Thus, extending flow track members are perfectly aligned along their length. The splice ends of each side rail have a cutout in them so that a low profile configuration is maintained.

4 Claims, 3 Drawing Sheets

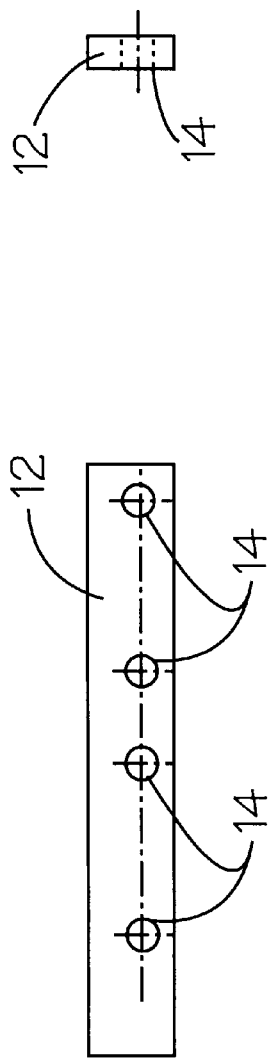
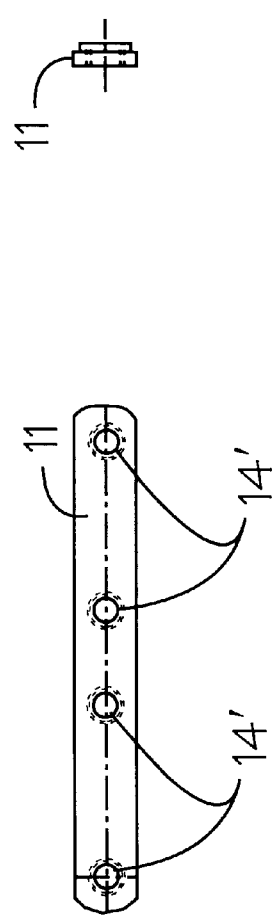

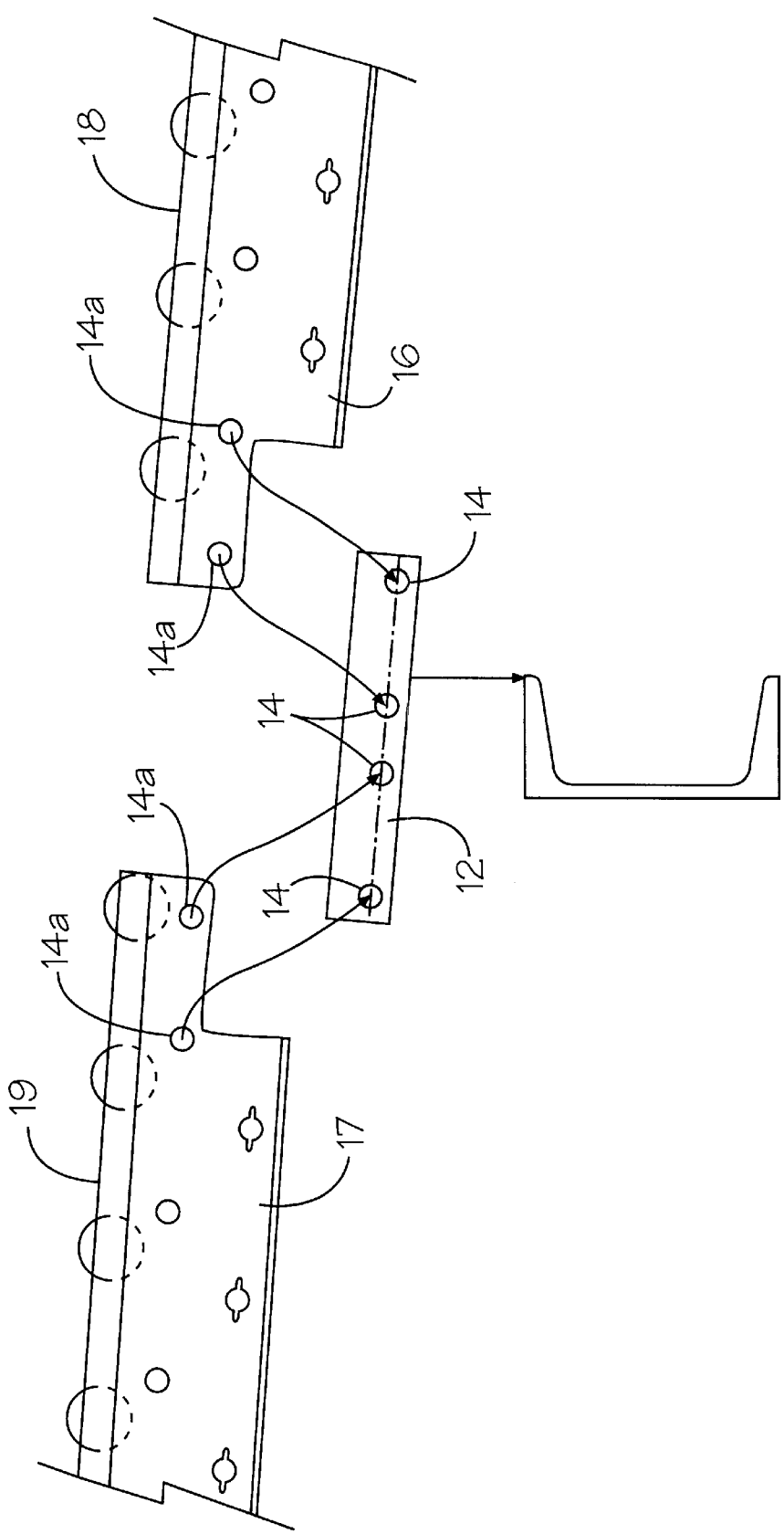

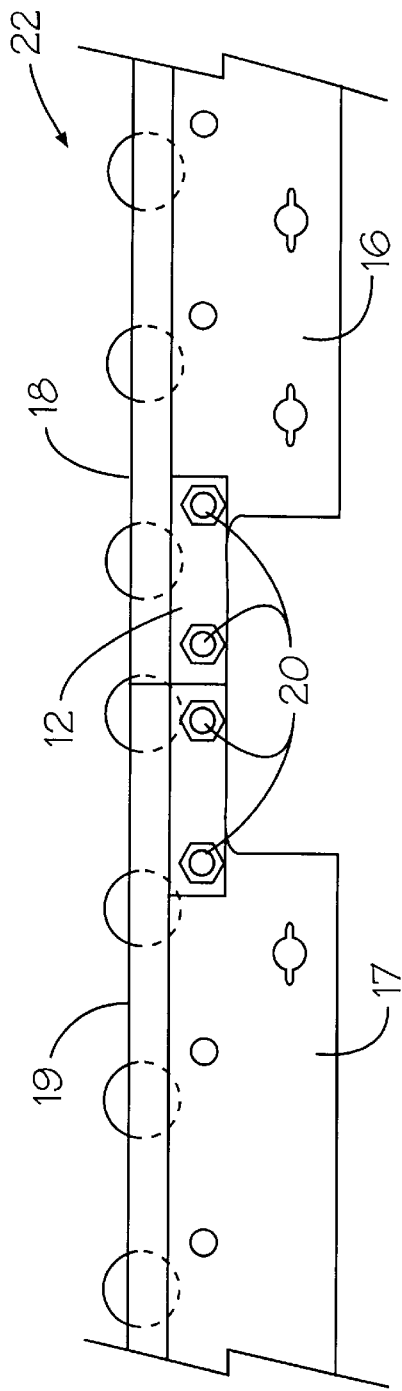
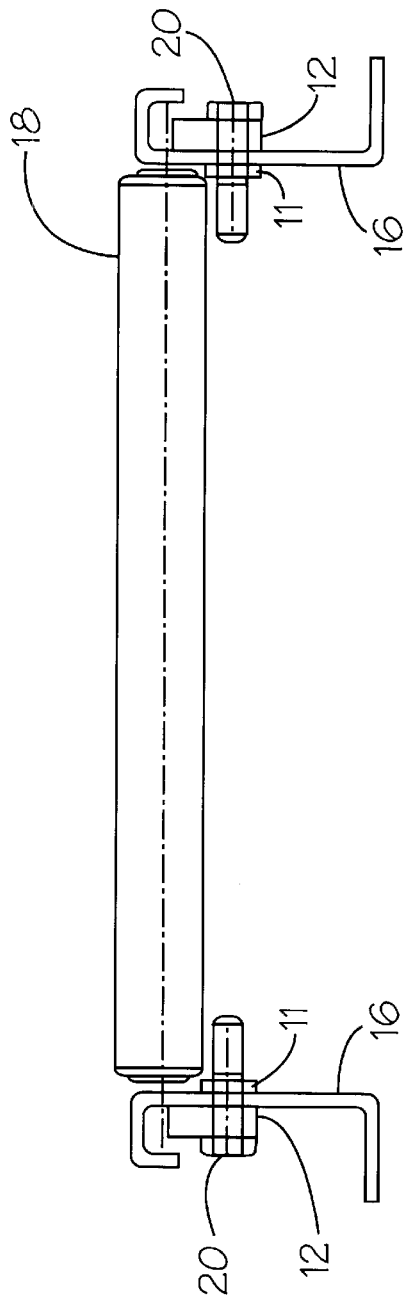

LOW PROFILE EXTENDED FLOW TRACK SYSTEM

FIELD OF THE INVENTION

The present invention pertains to flow track systems and, more particularly, to a low profile flow track extension system with a unifying splice.

BACKGROUND OF THE INVENTION

UNEX Manufacturing, Inc., pioneers of the extended flow track conveying system illustrated in U.S. Pat. No. 6,132, 158, issued on Oct. 17, 2000, has used hanger elements to provide track extensions for low profile, drop-loading of the track conveyors. The hanger elements require horizontal beams upon which they can be hung, in order to drop-load the track conveyors.

UNEX Manufacturing has recently invented a low profile flow track that has drop-loading capability without the need for intermediate hanger elements, as illustrated in U.S. Pat. No. 6,102,185, issued on Aug. 15, 2000. The low profile track of this patent has a cutout portion that conforms to the horizontal crossbeam, thus allowing drop loading without the need for hanger elements.

It would be desirable to construct extended pallet racks for each storage tier using this type of low profile flow track. To do this, each track will require a mid-support beam upon which to rest.

The present invention features a new pair of splice elements for connecting tandem flow tracks in order to provide extended spans. These new splice elements provide the advantage of eliminating horizontal shifting between extended track elements while maintaining low profile. Extending flow track members are now perfectly aligned to each other along their extended length. It is important to note that with hanger adjoined flow tracks, horizontal shifting of front and rear extension members along the mid-point beams is possible.

SUMMARY OF THE INVENTION

In accordance with the present invention, there is featured an improved track extension system. The improved track extension comprises tandem, front and rear flow tracks that are connected by a pair of inner and outer splice members, which span across the respective right and left side rails of the respective front and rear flow tracks. The new splice members provide the advantage of eliminating horizontal shifting between the front and rear flow track members. Thus, extending flow track members are perfectly aligned along their length.

It is an object of the present invention to provide an improved flow track extension system.

It is another object of this invention to provide means by which tandem flow tracks can be connected with perfect longitudinal alignment.

It is another object of this invention to maintain a low profile at the splice/beam intersection.

BRIEF DESCRIPTION OF THE DRAWINGS

A complete understanding of the present invention may be obtained by reference to the accompanying drawings, when considered in conjunction with the subsequent detailed description, in which:

FIGS. 1 and 1a illustrate respective front and side views of the outside splice member of this invention;

FIGS. 2 and 2a depict respective front and side views of the inside splice member of this invention;

FIG. 3 shows a front, exploded, unassembled view of the spliced flow track system of this invention;

FIG. 4 illustrates a front view of the assembled spliced flow track system shown in FIG. 3; and FIG. 5 depicts a side view of the assembled spliced flow track system shown in FIG. 4.

For purposes of brevity and clarity, like components and elements of the apparatus of this invention bear the same designations or numbering throughout the figures.

DESCRIPTION OF THE PREFERRED EMBODIMENT

Generally speaking, the invention features an extended flow track system comprising a pair of inner and outer splice members for linking the side rails of tandem flow tracks. The splice members eliminate horizontal shifting between the front and rear flow track members. Extending flow track members are thus perfectly aligned along their length.

Now referring to FIGS. 1 and 1a, an outside splice member 12 is illustrated. The outside splice member 12 comprises an elongated bar that has bolt holes 14 for attaching the outer splice member 12 across the front and rear aside rails 16 and 17, respectively, of front and rear flow tracks 18 and 19, as illustrated in FIGS. 3 and 4. The bolt holes 14 of splice member 12 are aligned with bolt holes 14a disposed upon the respective rear flow tracks 18 and 19, as shown in FIG. 3.

Referring to FIGS. 2 and 2a, an inside splice member 11 is illustrated. The inside splice member 11 includes an elongated bar that has bolt holes 14' for attaching the inner splice member 11 across the front and rear side rails 16 and 17, respectively, of respective front and rear flow tracks 18 and 19, as illustrated in FIGS. 3 and 4. The bolt holes 14' of splice member 11 are aligned with bolt holes 14a disposed upon the respective flow tracks 18 and 19, as shown in FIG. 3. Then, bolts 20 are passed through the bolt holes 14a to accomplish a bridging of the two respective splices 11 and 12 across front and rear flow tracks 18 and 19, respectively, in order to fabricate the extension 22, as shown in FIG. 4.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A flow track extension for a storage system, comprising:
   first and second drop-loading flow tracks each having side rails and spaced apart, elongated rollers disposed between said side rails, and disposed in tandem with respect to each other to form an extension;
   an outer splice member for connecting said first and second drop-loading flow tracks in order to form said extension;
   an inner splice member for connecting said first and second drop loading flow tracks in order to form said extension; and
   means for affixing said outer and inner splice members to said side rails of said first and second drop loading flow tracks.

2. A flow track extension apparatus for a storage system, comprising tandem flow tracks that are drop loaded onto end beams of a storage tier, and connectively bridged by at least one pair of splice members, said at least one pair of splice members each including an elongated bar having means for affixing said elongated bar to each one of said tandem flow tracks.

3. The flow track extension apparatus in accordance with claim 2, comprising two pairs of splice members, said two pairs of splice members comprising a pair of outer splice members and a pair of inner splice members.

4. A flow track extension system for a storage unit, comprising:

first and second flow tracks each having side rails with elongated, spaced apart rollers disposed between said side rails, and disposed in tandem with respect to each other to form an extension;

an outer, elongated member for connecting said first and second flow tracks in order to form said extension;

an inner, elongated member for connecting said first and second flow tracks in order to form said extension; and means for affixing said outer and inner elongated members to said side rails of said first and second flow tracks.

* * * * *